US005780940A

United States Patent [19]

Gauvreau, Jr. et al.

[11] Patent Number: 5,780,940

[45] Date of Patent: Jul. 14, 1998

[54] HOT WIRE SAFETY SWITCH

[75] Inventors: Gerald Gauvreau, Jr., Levittown; Raymond McClintic, Bensalem, both of Pa.

[73] Assignee: Air Check Corp., Levittown, Pa.

[21] Appl. No.: 713,221

[22] Filed: Sep. 12, 1996

[51] Int. Cl.$^{6}$ .......... H02P 7/29

[52] U.S. Cl. .......... 307/118; 49/27; 318/471; 200/81 R; 200/81.9 R

[58] Field of Search .......... 307/117, 118, 307/119, 125, 131, 126, 127, 128, 129, 130, 139, 140, 144; 340/603, 626; 49/26, 27, 28, 367, 370; 318/641, 471, 473; 200/61.43, 81 R, 81.9 R

[56] References Cited

U.S. PATENT DOCUMENTS

| | | | |
|---|---|---|---|
| 2,843,690 | 7/1958 | Miller | 49/27 |
| 3,051,872 | 8/1962 | Cowherd | 307/144 |
| 3,303,303 | 2/1967 | Miller | 200/61.43 |
| 3,840,870 | 10/1974 | Norrod | 340/626 |
| 3,950,725 | 4/1976 | Kitajima | 340/940 |
| 4,152,688 | 5/1979 | Dietz | 307/118 |
| 4,250,434 | 2/1981 | Valansot | 307/144 |
| 4,548,128 | 10/1985 | Morikawa et al. | 98/115.3 |
| 4,698,967 | 10/1987 | Longora | 49/27 |
| 5,027,552 | 7/1991 | Miller et al. | 49/27 |
| 5,201,221 | 4/1993 | Forgacs et al. | 73/204.26 |
| 5,240,445 | 8/1993 | Sharp | 454/61 |
| 5,259,143 | 11/1993 | Mitchell et al. | 49/27 |
| 5,394,746 | 3/1995 | Williams | 73/204.15 |
| 5,410,298 | 4/1995 | Wiseman | 307/118 |
| 5,457,766 | 10/1995 | Ko | 318/471 |
| 5,481,076 | 1/1996 | Mullet et al. | 49/27 |
| 5,488,276 | 1/1996 | Nishibe | 318/641 |
| 5,566,504 | 10/1996 | Pitel | 49/28 |

*Primary Examiner*—William M. Shoop, Jr.
*Assistant Examiner*—Peter Ganjian
*Attorney, Agent, or Firm*—Gregory J. Gore

[57] ABSTRACT

A remote switch includes a fluid-containing tube connected to a fluid-sensing switch. A hot wire sensor detects changes in flow through the conduit tube and is electrically connected to breaker switch circuitry. Because the switch is responsive to flow, rather than pressure, the operation of the switch will continue, even if the conduit becomes punctured, cut or damaged. The device is particularly useful as a means for actuating a safety switch to interrupt the electrical power in an emergency.

11 Claims, 2 Drawing Sheets

HOT WIRE SAFETY SWITCH

FIELD OF THE INVENTION

The present invention relates to pneumatically-controlled electrical switches; more specifically, to those actuated by a fluid-containing conduit connected to the switch device.

BACKGROUND OF THE INVENTION AND DESCRIPTION OF PRIOR ART

Pneumatically-controlled switches are very well-known and are most commonly employed as remote contact sensors which produce a signal when a deformable tube is compressed. Because the fluid in the tube is sealed, the change in volume of the tube as it is deformed creates a pressure change which is detected by a pressure switch, usually of the diaphragm type. Movement of the diaphragm makes mechanical contact with other structures to provide the desired switching.

Because the diaphragm-type switch of the prior art requires pressure to operate, the diaphragm must at all times remain sealed in a closed loop pneumatic circuit. If the seal anywhere in the loop is broken, the circuit becomes inactive. This potential failure of prior art pneumatic circuits makes this type of switch unreliable, and especially undesirable in applications where safety is required and the failure of the switch may result in injury or death. There is therefore a need in the art for a fluid-controlled switch which provides remote contact sensing, but which avoids the possible failure of the mechanical structures of the prior art.

The most pertinent patent prior art of which the applicants are aware includes U.S. Pat. No. 3,303,303 issued to N. K. Miller, entitled "Pneumatic Safety Edge for Power Operated Door". This patent describes a pneumatic contact sensor used on the edge of a power-operated door, however, this system requires a closed-loop pneumatic circuit which must be sealed so that pressure changes may be detected by the sensor. U.S. Pat. No. 3,950,725 issued to Kitajima, entitled "Automobile Detecting and Announcing Device", shows a typical deformable tube type contact detector which requires a closed loop pneumatic circuit. Pressure-sensing circuitry initiates a signal to an announcing device. U.S. Pat. No. 5,394,746 issued to Williams, entitled "Hot Wire Flow Rate Measuring Circuit", discloses a flow sensing circuit which utilizes a hot wire as applied to an internal combustion engine management system that relies upon the detection and measurement of the flow rate in the induction system. The Williams device requires two sensors and does not teach or suggest the use of open-loop pneumatic conduits for remote sensing, nor the use of switch means to interrupt the power supply to signal or respond to an emergency condition.

SUMMARY OF THE INVENTION

In order to fulfill the need in the art described above, the present safety switch has been devised. The switch of the present invention includes a fluid-containing tube connected to a fluid-sensing switch; however, unlike the prior art, there is no need for a closed loop circuit sealed from the environment. This is possible because the present invention utilizes a hot wire sensor as the fluid detector. A hot wire sensor responds to changes in flow, not changes in pressure. It has been discovered by the inventors that a deformable conduit, such as a rubber tube with a hot wire sensor affixed to one end, will create sufficient flow at the sensor to initiate a switching function without the need for the tube to be sealed against the environment. Thus, if a deformable tube or other conduit which directs a flow to a hot wire sensor becomes punctured, cut or damaged, it will still function, and the operation of the safety switch will not be destroyed. This is particularly significant when deformable pneumatic contact tubes are used, because they often become worn through use. Even if the contact tube is torn or broken, using the sensor and switching circuitry of the present invention, the safety switch will continue to operate and therefore it provides a higher degree of reliability than can be achieved by the prior art.

More specifically, the invention comprises a remote sensor, having a flow generator; conduit means in fluid communication with the flow generator at a first end of the conduit means; sensing means connected to a second end of the conduit means such that the sensing means receives fluid flow from the flow generator; and switch means connected to and activated by the sensing means. The actuation of the switch means can break a circuit or initiate a signal which may be an alarm. The flow generator may be located proximate to an operative device for detecting a dangerous condition of the device and can be a hollow deformable container of air which is affixed to the device or may be merely an extension of the conduit if it is deformable. The container and pneumatic circuit is not sealed and the sensing means is preferably a hot wire sensor. The invention is used in conjunction with a device which is electrically powered. The switch means may be utilized to interrupt the electrical power to the device to provide an emergency halt to parts of the device in motion.

The invention further includes electrical circuitry for activating the switch means, comprising: a bridge circuit having two legs, the hot wire sensor connected to a first leg; and a second leg of the bridge circuit connected to a differential amplifier which provides an output voltage to the base of a transistor which in turn provides power to a relay for moving a switch between off and on states.

Other objects, advantages and novel features of the invention will become apparent from the following detailed description of the invention when considered in conjunction with the accompanying drawings.

DESCRIPTION OF THE PREFERRED EMBODIMENT

Figure 1:
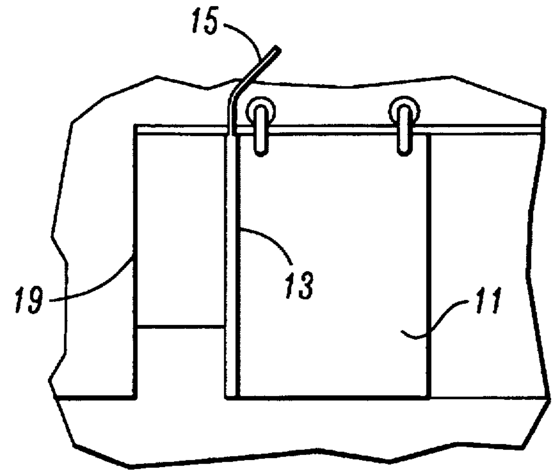
FIG. 1 is a front elevational view showing the present invention utilized as a door edge sensor.
Figure 2:
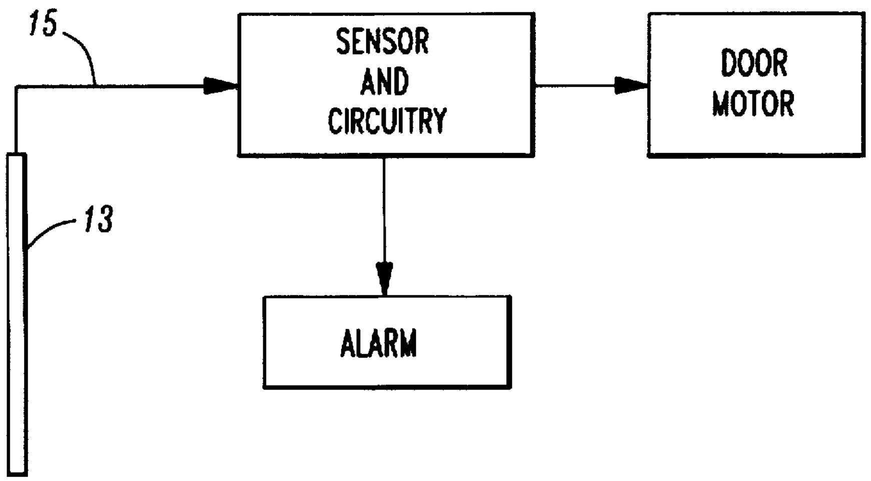
FIG. 2 is a diagrammatic view showing the deformable conduit contact sensor connected to the detector means.

Referring now to FIG. 1, one embodiment of the present invention is shown which is illustrative of the environment in which the invention may be used in an ordinary setting to detect physical contact at a remote location. In this case, door 11 is fitted with deformable strip 13 along its vertical leading edge. The strip is a hollow container of air and provides a force detecting flow generator which is connected through pneumatic conduit 15 to the sensor circuitry as shown in FIG. 2. The conduit may be simple tubing. If the tubing is deformable, the strip 13 may be merely an extension of a portion of the tubing. The door shown in this figure is slidable horizontally and when closed, the sensor strip is in contact with the opposing door jam 19. The door 11 is a motorized door with specific means of actuation not shown in this figure as it forms no part of the invention.

Referring now to FIG. 2, a simple diagram illustrates the pneumatic conduit connected to the door edge strip which is also connected to the sensor and circuitry as more specifically described with regard to FIG. 3 below. In this embodiment, the sensor circuitry provides safety switching to disconnect the power from the motor means which actuate door 11 shown in FIG. 1. This provides a safety feature that will halt the closing of the motorized door when an object between the door edge and the jam is contacted by the edge strip. The sensor circuitry may also activate a sound or light alarm to indicate a dangerous condition. While the preferred embodiment discloses a deformable strip as a flow-generating fluid container, any combination of structures which would create a flow of fluid, in most cases air, through the conduit may be used in combination with the sensor and circuitry of the present invention.

Figure 3:
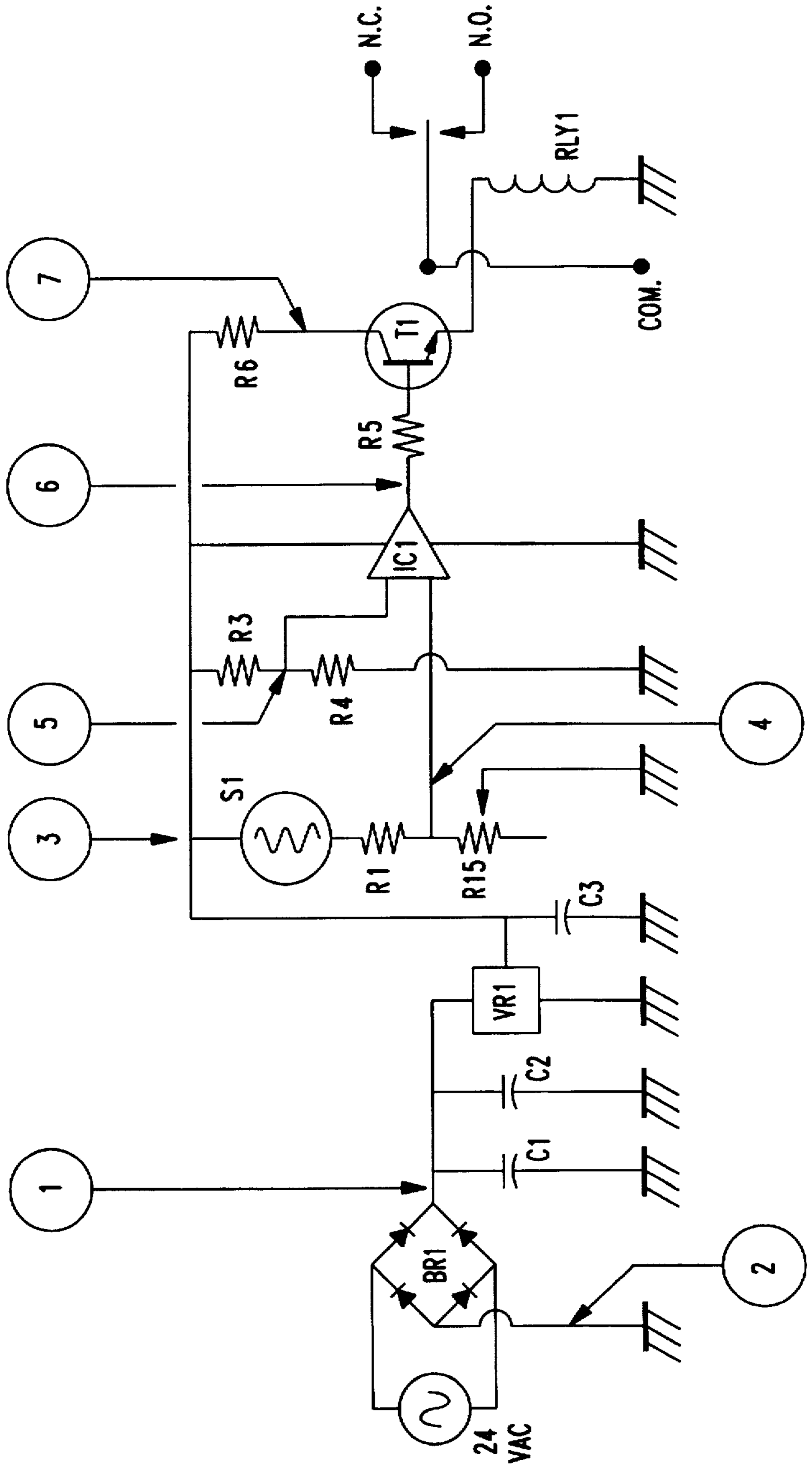
FIG. 3 is an electrical diagram showing the detector circuitry of the present invention.

Referring now to FIG. 3, the electrical circuitry which actuates the safety switch of the present invention may be described as follows. An AC voltage is applied across BR1 changing the AC voltage to pulsing DC at point 1 positive, point 2 negative. This pulsing DC is smoothed by capacitors C1 and C2, and then applied to VR1 for regulation. Capacitor C3 adds further filtering to compensate for sudden load changes. The rectified and regulated voltage is then applied to a second bridge point 3. One leg of the bridge consists of sensor 1 (a hot wire sensor) and current limiting resistor R1; S1, R1 and R15 are configured as a voltage divider. Point 4 is the junction of the divider with the balance being adjusted by resistor R15. The second leg of the bridge is comprised of two resistors, R3 and R4, also configured as voltage dividers at point 5. When the voltage at points 4 and 5 are equal (the bridge is in balance), this balance voltage is then applied to a differential amplifier IC1, providing an output voltage at point 6. This voltage is limited by resistor R5 and applied as base voltage to transistor T1. T1 is used as a driver for relay, RLY 1, when the bridge in is balance, thus holding the relay coil in its energized state.

This circuitry operates as follows. When a force contacts the deformable air container, air directed through the conduit moves over the flow detecting element of the hot wire sensor, S1, the voltage in the bridge is unbalanced by the current flow thru S1, R1, and R15. This imbalance causes differential amplifier IC1 to cease voltage output at point 6, and thus cease the voltage applied to the base of driver T1, and therefore the transistor turns off. With T1 in its off state, the relay is de-energized and the relay switching state changes. This switching state change interrupts the power which ordinarily flows across the relay switch, such as power to the motorized door depicted in FIG. 1.

The present invention relies on the discovery that even deformable pneumatic conduits that are unsealed, and therefore do not present a closed loop pressure-producing state when they are deformed, can nonetheless provide sufficient fluid flow to be detected by a hot wire sensor at a remote location. This sensor, when in concert with circuitry such as explained in FIG. 3, may then actuate switch means for various purposes Such as to provide a safety feature. The present sensor and switch circuitry may be used in many other applications and can be applied to either de-actuate power to a device, to actuate an alarm, or to power a safety system such as a fire extinguisher or a communications system. Remote-controlled pneumatic switches are particularly advantageous where the contact to be sensed must be non-electrical, such as in personal safety applications near water or in the proximity of other electrical devices, such as machinery.

It should be understood that the above description discloses specific embodiments of the present invention and are for purposes of illustration only. There may be other modifications and changes obvious to those of ordinary skill in the art that fall within the scope of the present invention which should be limited only by the following claims and their legal equivalents.

What is claimed is:

1. A remote sensor, comprising:

a flow generator;

conduit means in fluid communication with said flow generator at a first end of said conduit means;

hot wire sensing means connected to a second end of said conduit means such that said sensing means receives fluid flow through an unsealed pneumatic circuit from said flow generator; and switch means electrically connected to and activated by said sensing means when flow is sensed, whereby the actuation of said switch means initiates a signal.

2. The remote sensor of claim 1, wherein said flow generator is located proximate to a device for detecting a dangerous condition of said device.

3. The remote sensor of claim 2, wherein said flow generator is a deformable hollow container of fluid.

4. The remote sensor of claim 3, wherein said deformable container is affixed to said device.

5. The remote sensor of claim 4, wherein said fluid is air.

6. The remote sensor of claim 2, wherein said device is electrically powered.

7. The remote sensor of claim 6, wherein said switch means operates between two states and the change to one state interrupts the electrical power to said device.

8. The remote sensor of claim 7, wherein said signal is an alarm.

9. The remote sensor of claim 8, wherein said flow generator is connected to a part of said powered device which moves during the operation of said powered device.

10. The sensor of claim 9, wherein said device is a door.

11. The remote sensor of claim 10, further including electrical circuitry for actuating said switch, comprising:

a bridge circuit having two legs, said hot wire sensor connected to form part of a first leg; and a second leg of said bridge circuit connected to a differential amplifier, said second leg having a reference voltage applied thereto such that air flow over the sensor brings the first voltage into balance with said reference voltage, thus ceasing the output voltage of said differential amplifier to a base of a transistor which in turn turns off power to a relay thus moving said switch between off and on states.

* * * * *